(12) United States Patent
Hiramatsu

(10) Patent No.: US 10,988,066 B2
(45) Date of Patent: Apr. 27, 2021

(54) COMMUNICATION SYSTEM, VEHICLE UNIT, AND SEAT UNIT

(71) Applicant: YAZAKI CORPORATION, Tokyo (JP)

(72) Inventor: Ryo Hiramatsu, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/824,617

(22) Filed: Mar. 19, 2020

(65) Prior Publication Data

US 2020/0331373 A1 Oct. 22, 2020

(30) Foreign Application Priority Data

Apr. 22, 2019 (JP) .............................. JP2019-081012

(51) Int. Cl.
| | |
|---|---|
| *B60N 2/90* | (2018.01) |
| *B60R 16/033* | (2006.01) |
| *B60R 16/03* | (2006.01) |
| *H04B 1/3822* | (2015.01) |
| *H04W 52/02* | (2009.01) |
| *H04W 4/48* | (2018.01) |

(52) U.S. Cl.
CPC .............. *B60N 2/90* (2018.02); *B60R 16/03* (2013.01); *B60R 16/033* (2013.01); *H04B 1/3822* (2013.01); *H04W 4/48* (2018.02); *H04W 52/0235* (2013.01); *H04W 52/0254* (2013.01)

(58) Field of Classification Search
CPC ......... B60N 2/90; B60R 16/03; B60R 16/033; H04W 4/48; H04W 52/0235; H04W 52/0254; H04B 1/3822; H60W 60/0025

USPC .......................................... 455/66.1; 180/273
See application file for complete search history.

(56) References Cited

U.S. PATENT DOCUMENTS

| | | | | | |
|---|---|---|---|---|---|
| 5,168,451 A | * | 12/1992 | Bolger | ................... | G08G 1/127 340/994 |
| 5,479,157 A | * | 12/1995 | Suman | ............... | G07C 9/00182 340/426.12 |
| 5,524,952 A | * | 6/1996 | Czech | ..................... | B60N 2/14 296/65.12 |
| 5,717,387 A | * | 2/1998 | Suman | .................... | B60R 25/00 340/7.2 |
| 6,024,398 A | * | 2/2000 | Horton | .................. | B60N 2/062 296/65.07 |

(Continued)

FOREIGN PATENT DOCUMENTS

JP 2013-67322 A 4/2013

*Primary Examiner* — Hai V Nguyen
(74) *Attorney, Agent, or Firm* — Kenealy Vaidya LLP

(57) ABSTRACT

A communication system includes a seat unit configured to be mounted on a seat of a vehicle and to receive power supply from a battery to operate, and a vehicle unit configured to wirelessly communicate with the seat unit. The vehicle unit includes a determination section configured to determine whether communication with the seat unit is necessary, and a command transmission section configured to transmit to the seat unit a transmission command requesting the seat unit to transmit information on an electronic device mounted on the seat during a period in which the determination section determines that the communication with the seat unit is necessary. The seat unit is configured to transmit the information on the electronic device upon receipt of the transmission command.

6 Claims, 10 Drawing Sheets

(56) References Cited

U.S. PATENT DOCUMENTS

| | | | |
|---|---|---|---|
| 6,028,537 A * | 2/2000 | Suman | B60K 35/00 340/988 |
| 6,242,701 B1 * | 6/2001 | Breed | B60N 2/002 177/144 |
| 6,557,919 B2 * | 5/2003 | Suga | B60N 2/14 296/65.07 |
| 6,820,896 B1 * | 11/2004 | Norton | G01G 19/4142 177/141 |
| 6,849,807 B2 * | 2/2005 | Casey | B60N 2/0705 177/144 |
| 6,928,889 B2 * | 8/2005 | Kojima | G01G 19/4142 73/862.451 |
| 7,334,829 B2 * | 2/2008 | Fukui | B60N 2/0228 296/65.11 |
| 7,434,863 B2 * | 10/2008 | Hamazaki | B60N 2/146 296/65.06 |
| 7,594,699 B2 * | 9/2009 | Satta | B60N 2/0244 297/361.1 |
| 8,033,589 B2 * | 10/2011 | Kusanagi | B60N 2/067 296/68.1 |
| 8,054,158 B2 * | 11/2011 | Nakashima | G07C 9/00309 340/5.61 |
| 8,311,560 B2 * | 11/2012 | Kong | G08G 1/005 455/456.3 |
| 8,854,197 B2 * | 10/2014 | Ikeda | G08G 1/165 340/425.5 |
| 8,936,295 B2 * | 1/2015 | Slungare | B60N 2/245 296/65.12 |
| 9,010,861 B2 * | 4/2015 | Seibold | B60N 2/146 297/344.24 |
| 9,065,531 B2 * | 6/2015 | Terada | B60N 2/0715 |
| 9,415,703 B2 * | 8/2016 | Slungare | B60N 2/245 |
| 10,059,231 B2 * | 8/2018 | Reuschel | B60N 2/0742 |
| 10,518,670 B1 * | 12/2019 | Olufemi-Jones | B60N 2/245 |
| 2003/0081935 A1 * | 5/2003 | Kirmuss | H04N 7/18 386/327 |
| 2003/0095688 A1 * | 5/2003 | Kirmuss | G08B 13/19647 382/105 |
| 2006/0004518 A1 * | 1/2006 | Sleboda | B60R 21/01532 701/300 |
| 2006/0217864 A1 * | 9/2006 | Johnson | B60N 2/067 701/45 |
| 2007/0046088 A1 * | 3/2007 | Satta | B60N 2/0244 297/344.1 |
| 2007/0120645 A1 * | 5/2007 | Nakashima | G07C 9/00309 340/5.61 |
| 2007/0221429 A1 * | 9/2007 | Fukui | B60N 2/0228 180/273 |
| 2008/0157940 A1 * | 7/2008 | Breed | B60N 2/853 340/425.5 |
| 2009/0043457 A1 * | 2/2009 | Shibagaki | G07C 9/00309 701/49 |
| 2010/0308999 A1 * | 12/2010 | Chornenky | G08B 6/00 340/573.1 |
| 2011/0009098 A1 * | 1/2011 | Kong | G08G 1/202 455/414.1 |
| 2012/0056734 A1 * | 3/2012 | Ikeda | G08G 1/165 340/425.5 |
| 2013/0200991 A1 * | 8/2013 | Ricci | G06F 3/04817 340/4.3 |
| 2013/0238167 A1 * | 9/2013 | Stanfield | B60Q 1/2696 701/2 |
| 2014/0206302 A1 * | 7/2014 | Terada | B60N 2/0715 455/90.1 |
| 2018/0207040 A1 * | 7/2018 | Fukuoka | H04Q 9/00 |
| 2019/0092280 A1 * | 3/2019 | Oesterling | H04L 63/0428 |
| 2019/0244522 A1 * | 8/2019 | Makita | G08G 1/123 |
| 2020/0101977 A1 * | 4/2020 | Nakai | G06K 9/00845 |

* cited by examiner

COMMUNICATION SYSTEM, VEHICLE UNIT, AND SEAT UNIT

CROSS-REFERENCE TO RELATED APPLICATION

The present application claims priority from Japanese Patent Application No. 2019-081012 filed on Apr. 22, 2019, the entire content of which is incorporated herein by reference.

BACKGROUND

The present invention relates to a communication system, and a vehicle unit and a seat unit that are used in the communication system. The communication unit includes the seat unit that is mounted on a seat of a vehicle and that operates upon receiving power supply from a battery, and the vehicle unit that wirelessly communicates with the seat unit.

A related art signal receiving device performs infrared communication between a slide seat and a vehicle, and uses a battery as a power source of a slide seat side, so that routing of wire harness between the slide seat and the vehicle is avoided (see, e.g., JP2013-67322A).

However, according to the signal receiving device described above, communication between the slide seat and the vehicle is being performed even during a period in which communication with the slide seat is not necessary. For this reason, battery exhaustion occurs quickly.

SUMMARY

Illustrative aspects of the present invention provide a communication system capable of extending battery life, a vehicle unit, and a seat unit.

According to an illustrative aspect of the invention, a communication system includes a seat unit configured to be mounted on a seat of a vehicle and to receive power supply from a battery to operate, and a vehicle unit configured to wirelessly communicate with the seat unit. The vehicle unit includes a determination section configured to determine whether communication with the seat unit is necessary, and a command transmission section configured to transmit to the seat unit a transmission command requesting the seat unit to transmit information on an electronic device mounted on the seat during a period in which the determination section determines that the communication with the seat unit is necessary. The seat unit is configured to transmit the information on the electronic device upon receipt of the transmission command.

According to another illustrative aspect of the invention, a vehicle unit is configured to wirelessly communicate with a seat unit mounted on a seat of a vehicle, the seat unit being configured to receive power supply from a battery to operate. The vehicle unit includes a determination section configured to determine whether communication with the seat unit is necessary, and a command transmission section configured to transmit to the seat unit a transmission command requesting the seat unit to transmit information on an electronic device mounted on the seat during a period in which the determination section determines that the communication with the seat unit is necessary.

According to another illustrative aspect of the invention, a seat unit is configured to be mounted on a seat of a vehicle and to receive power supply from a battery to operate, the seat unit being configured to wirelessly communicate with the vehicle unit described above. The seat unit includes an information transmission section configured to transmit information on an electronic device upon receipt of the transmission command from the vehicle unit.

Other aspects and advantages of the invention will be apparent from the following description, the drawings and the claims.

DETAILED DESCRIPTION

Hereinafter, exemplary embodiments of the present invention will be described with reference to the drawings.

Figure 1:
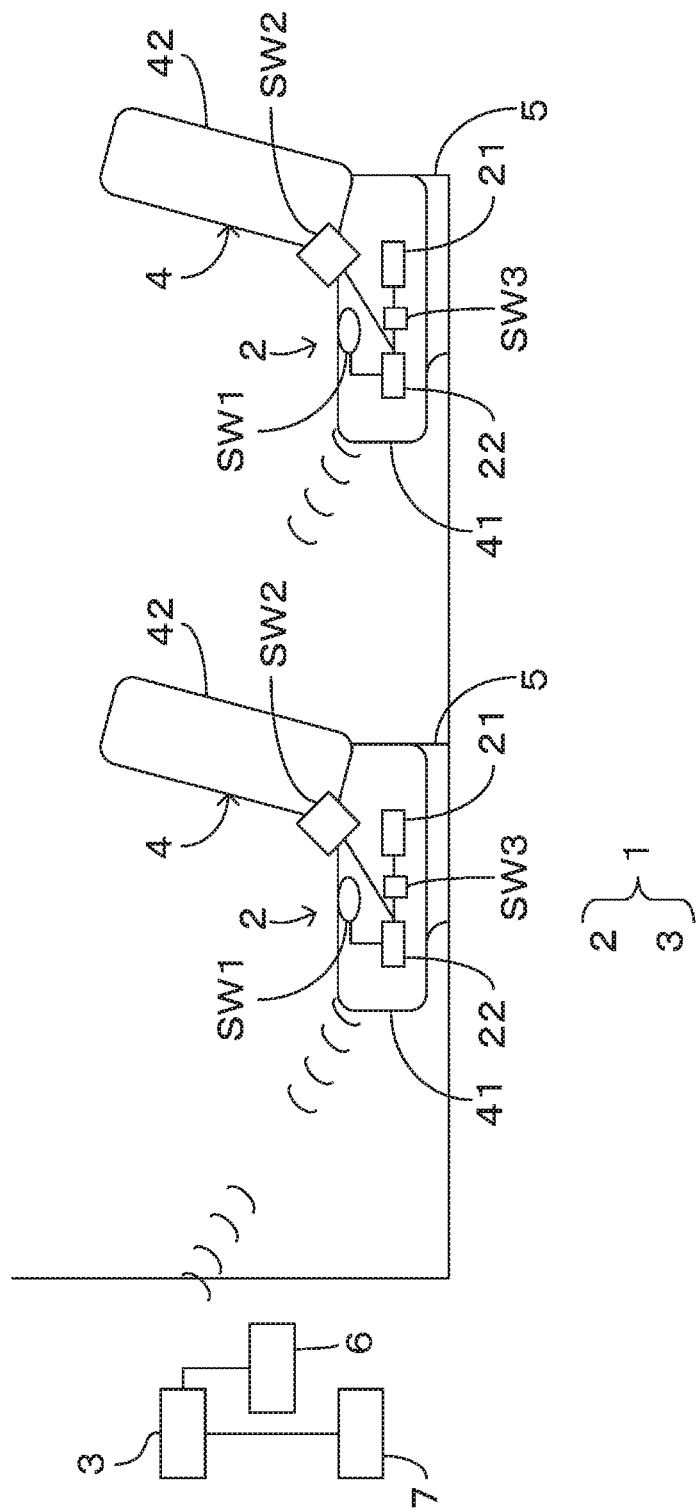
FIG. 1 is an illustrative diagram illustrating configurations of a vehicle unit and a seat unit that constitute a communication system of the invention.

As illustrated in FIG. 1, a communication system 1 includes a seat unit 2 provided on a slide seat 4 (seat) and a vehicle unit 3 provided on a vehicle (vehicle body). The communication system 1 is a system that wirelessly transmits information on an electronic device provided on the slide seat 4 from the seat unit 2 to the vehicle unit 3.

The slide seat 4 is mounted on the vehicle, and mainly includes a seat cushion 41 and a seat back 42. With a rail 5 that is provided below the seat cushion 41, the slide seat 4 is slidable along a front-rear direction of the vehicle.

One seat unit 2 is mounted on one slide seat 4, and operates depending on a battery 21. In the present embodiment, the battery 21 is constituted by a primary battery that cannot be charged, and is, for example, a battery that needs to be regularly replaced, such as at the time of vehicle inspections.

Further, in the present embodiment, an example in which the seat unit 2 is mounted on all the slide seats 4 (driver's seat, assistant driver's seat, and rear seats) mounted on the vehicle will be described, and the invention is not limited thereto. The seat unit 2 may be mounted on only the slide seat 4 serving as the driver's seat, or may be mounted on only the slide seats 4 serving as the driver's seat and the assistant driver's seat.

Figure 2:
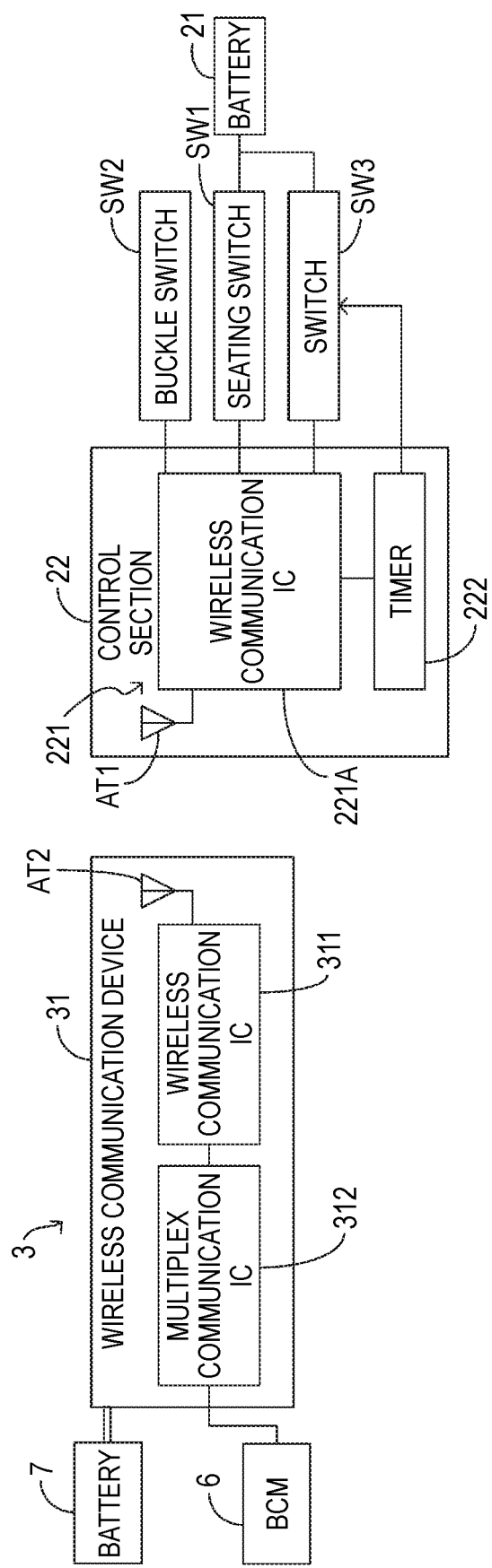
FIG. 2 is a schematic configuration diagram of the communication system illustrated in FIG. 1.

As illustrated in FIG. 2, the seat unit 2 includes a seating switch SW1, a buckle switch SW2, a control section 22, and a power switch SW3. The seating switch SW1 is one of electronic devices mounted on the slide seat 4. The seating switch SW1 is, for example, disposed in the seat cushion 41 as illustrated in FIG. 1, is pressed to be turned on when an occupant is seated on the slide seat 4, and is turned off when the occupant leaves the slide seat 4. Seating of the occupant can be detected based on an on-off state of the seating switch SW1.

Figure 3:
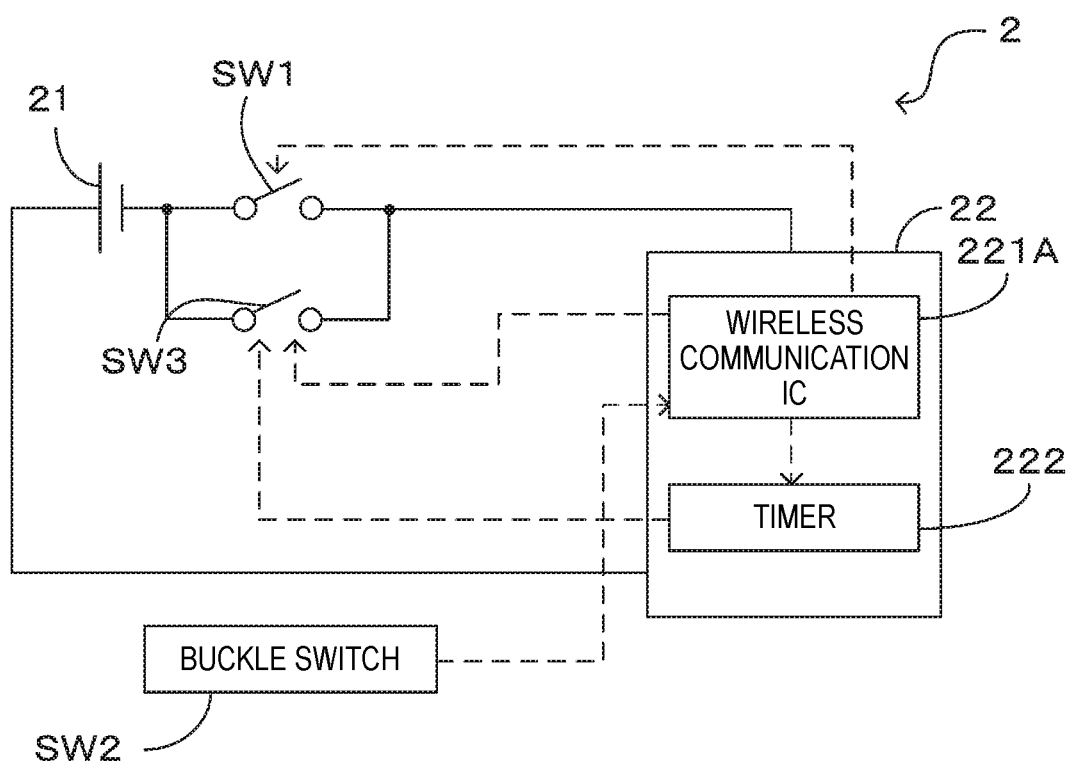
FIG. 3 is a detailed electrical configuration diagram of the seat unit illustrated in FIG. 1.

In the present embodiment, as illustrated in FIG. 3, the seating switch SW1 is provided in a power supply line between the battery 21 and the control section 22 to be described below. In FIG. 3, a solid line indicates a power supply line, and a dotted line indicates a signal line. The seat unit 2 transmits on-off information of the seating switch SW1 to the vehicle unit 3.

The buckle switch SW2 is one of the electronic devices mounted on the slide seat 4. The buckle switch SW2 is provided in a buckle of a seat belt as illustrated in FIG. 1, is turned on when a tongue thereof is inserted into the buckle of the seat belt, and is turned off when the tongue is pulled out. Seat belt wearing of the occupant can be detected based on an on-off state of the buckle switch SW2.

In the present embodiment, the seating switch SW1 and the buckle switch SW2 are described as examples of the electronic devices mounted on the slide seat 4, and the invention is not limited thereto. For example, various sensors provided on the slide seat 4 may be the electronic devices.

The control section 22 acquires information on the electronic devices including the seating switch SW1 and the buckle switch SW2, and wirelessly transmits the acquired information to the vehicle unit 3. As illustrated in FIG. 2, the control section 22 includes a timer 222 and a wireless communication device 221 that performs and controls wireless communication (such as Bluetooth (registered trademark)) with the vehicle unit 3.

The wireless communication device 221 includes an exterior portion and a substrate housed in the exterior portion (none of which is illustrated), and is provided, on the substrate, with an antenna AT1 and a wireless communication IC 221A with a microcomputer function (hereinafter, abbreviated as "wireless communication IC 221A"). The wireless communication IC 221A is formed by IC forming a communication section that transmits and receives signals using the antenna AT1, and a microcomputer that controls the communication section (none of which is illustrated). On-off information on the seating switch SW1 and the buckle SW2 is supplied to the wireless communication IC 221A. The wireless communication IC 221A controls on and off of the power switch SW3.

The timer 222 starts a count of a predetermined period of time under the control of the wireless communication IC 221A, and outputs an off signal for turning off the power switch SW3 to be described below when finishing the count of the predetermined period of time. As illustrated in FIG. 3, the power switch SW3 is connected in the power supply line between the battery 21 and the control section 22, in parallel with the seating switch SW1.

The vehicle unit 3 is disposed, for example, on an instrument panel of a vehicle as illustrated in FIG. 1, and operates upon receiving power supply from a battery 7. The battery 7 is constituted by a secondary battery and is charged by an alternator. As illustrated in FIG. 2, the vehicle unit 3 is constituted by a wireless communication device 31. The wireless communication device 31 includes an exterior portion and a substrate housed in the exterior portion (none of which is illustrated), and is provided, on the substrate, with an antenna AT2, a wireless communication IC 311 with a microcomputer function (hereinafter, abbreviated as "wireless communication IC 311"), and a multiplex communication IC 312.

The wireless communication IC 311 is formed by IC forming a communication section that transmits and receives signals using the antenna AT2, and a microcomputer that controls the communication section (none of which is illustrated). The multiplex communication IC 312 is an IC for multiplex communication (such as CAN and CXPI) with a body control module (BCM) 6. The BCM 6 is mounted on an instrument panel of a vehicle, receives information on electronic devices mounted on the slide seat 4 from the vehicle unit 3, and performs predetermined control. In the present embodiment, the BCM 6 receives an on-off signal of the seating switch SW1 and the buckle switch SW2 from the vehicle unit 3, and outputs a warning when seating is detected while the seat belt is not worn.

Figure 4:
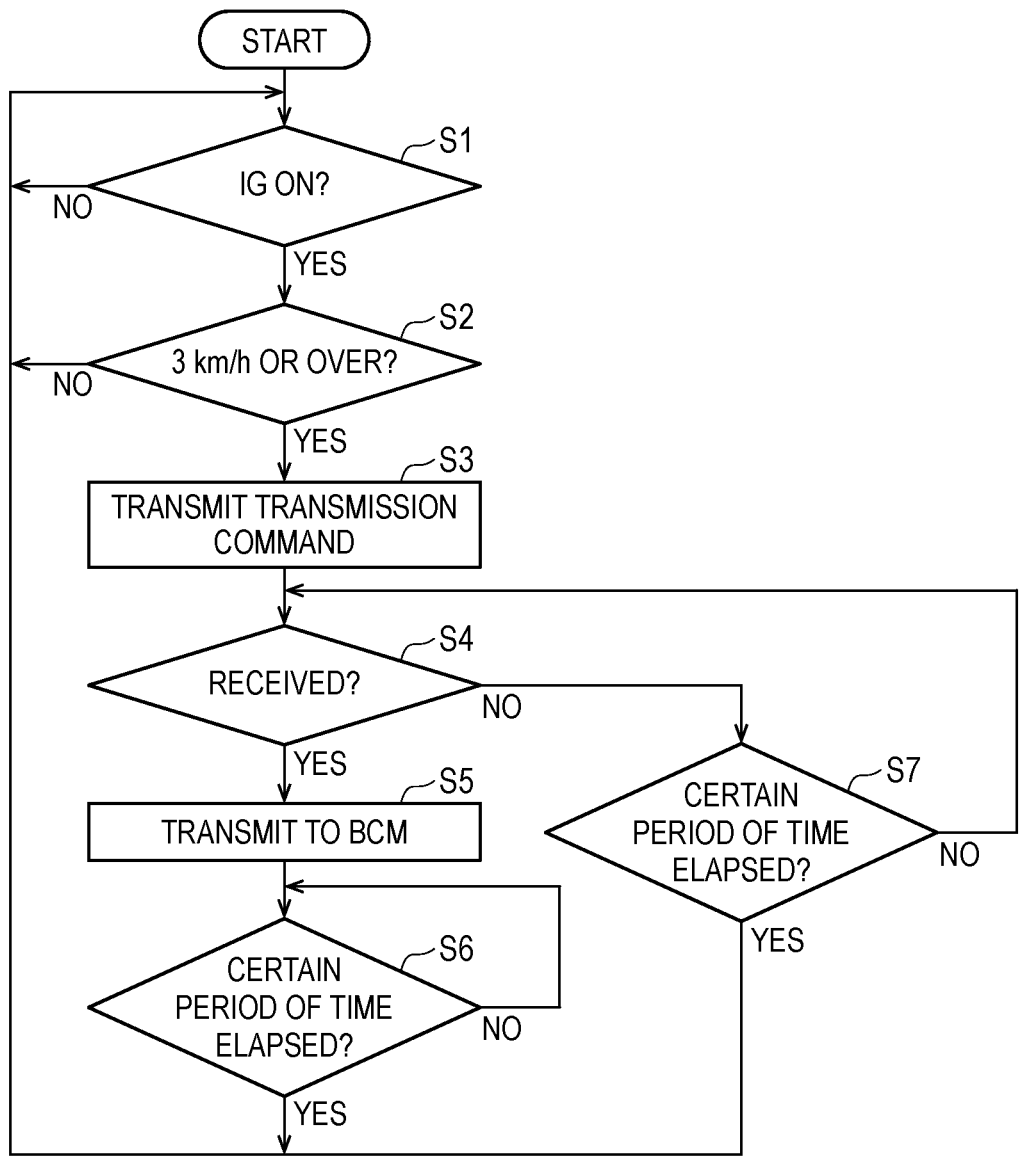
FIG. 4 is a flowchart illustrating a processing procedure of the vehicle unit illustrated in FIG. 1.
Figure 5:
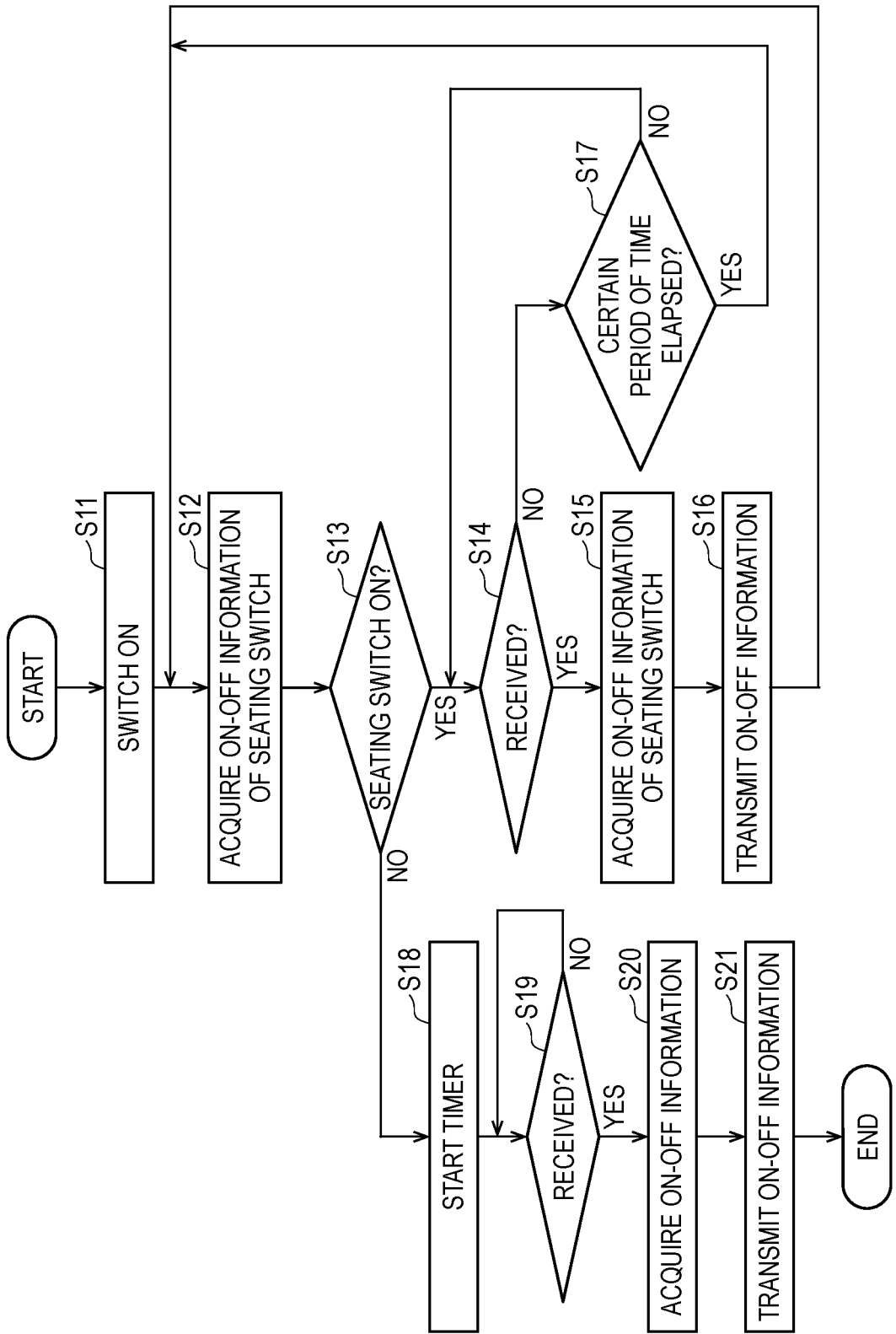
FIG. 5 is a flowchart illustrating a processing procedure of the seat unit illustrated in FIG. 1.

Next, operations of the communication system 1 having the configuration described above will be described below with reference to FIGS. 4 and 5. First, the wireless communication IC 311 of the vehicle unit 3 (hereinafter, may also be abbreviated as "vehicle unit 3") functions as a determination section, and determines whether an ignition (IG) switch is on and a speed of the vehicle is a predetermined value or larger (for example, 3 km/h or over) (steps S1 and S2 in FIG. 4). If the IG switch is on and the speed of the vehicle is 3 km/hr or over (Y in step S1 and Y in step S2), the vehicle unit 3 determines that communication with the seat unit 2 is necessary. Further, the wireless communication IC 311 of the vehicle unit 3 functions as a command transmission section, and sequentially transmits to each seat unit 2 a transmission command requesting each eat unit 2 to transmit information on the electronic devices mounted on the slide seat 4 (step S3).

Thereafter, upon receiving the information from each seat unit 2 (Y in step S4), the vehicle unit 3 controls the multiplex communication IC 312 to transmit the information received from the seat unit 2 to the BCM 6 (step S5). Next, the vehicle unit 3 waits until a certain period of time or longer elapses since the transmission command is transmitted (Y in step S6), and returns to step S again. Accordingly, the vehicle unit 3 transmits a transmission command to the seat unit 2 at an interval of the certain period of time, during a period in which the IG switch is on and the speed of the vehicle is 3 km/h or over. On the other hand, if the vehicle unit 3 cannot receive the information from the seat unit 2 even when the certain period of time or longer elapses since the transmission command is transmitted (Y in step S7), the vehicle unit 3 immediately returns to step S1.

In the seat unit 2, the power switch SW3 is turned off in an initial state. Therefore, the seating switch SW1 and the power switch SW3 are also turned off during a period in which the occupant is not sitting on the slide seat 4, and thus power supply to the control section 22 is cut off. Thereafter, when the occupant sits on the slide seat 4, the seating switch SW1 is turned on. Power is supplied to the control section 22 in response to on of the seating switch SW1, and the wireless communication IC 221A of the seat unit 2 (hereinafter, simply abbreviated as "seat unit 2") performs an operation. When the power is turned on, the seat unit 2 first turns on the power switch SW3 (step S11 in FIG. 5).

Thereafter, the seat unit 2 acquires on-off information of the seating switch SW1 (step S12). If the acquired on-off information is information indicating on of the seating switch SW1 (Y in step S13), the seat unit 2 determines whether a transmission command is received from the vehicle unit 3 (step S14). Upon receiving the transmission command (Y in step S14), the seat unit 2 acquires on-off information of the buckle switch SW2 (step S15).

Next, the wireless communication IC 221A of the seat unit 2 functions as an information transmission section to wirelessly transmit the on-off information of the seating switch SW1 and the buckle switch SW2, which is acquired in steps S12 and S15, to the vehicle unit 3 (step S16), and returns to step S12. The on-off information of the seating switch SW1 transmitted in step S16 is information indicating on of the seating switch SW1. On the other hand, if the transmission command cannot be received even when a certain period of time elapses (N in step S14 and Y in step S17), the seat unit 2 immediately returns to step S12.

In contrast, if the on-off information of the seating switch SW1 acquired in step S12 is information indicating off of the seating switch SW1 (N in step S13), the seat unit 2 causes the timer 222 to start a count (step S18). At this time, since the power switch SW3 is maintained on even when the seating switch SW1 is turned off, the power supply to the control section 22 is continued.

Thereafter, the seat unit 2 determines whether a transmission command is received (step S19). The seat unit 2 waits until a transmission command is received (Y in step S19), and proceeds to step S20. In step S20, the seat unit 2 acquires the on-off information of the buckle switch SW2. Thereafter, the seat unit 2 transmits the on-off information of the seating switch SW1 and the buckle switch SW2, which is acquired in steps S12 and S20, to the vehicle unit 3 (step S21), and ends the processing. The on-off information of the seating switch SW1 transmitted in step S21 is information indicating off of the seating switch SW1.

Upon ending the count of a predetermined period of time, the timer 222 outputs an off signal to the power switch SW3. Accordingly, the power switch SW3 is turned off, and the power supply from the battery 21 to the control section 22 is cut off. The predetermined period of time is set to be a period of time longer than the certain period of time, which is a transmission interval of the transmission command transmitted by the vehicle unit 3 described above. Therefore, during a period in which the timer 222 is counting the predetermined period of time, the seat unit 2 can receive the transmission command (Y in step S19) and transmit a fact that the seating switch SW1 is turned off to the vehicle unit 3 (step S21). Note that in cases such as one where the vehicle is stopped with the IG on, the transmission command may not be received from the vehicle unit 3 after a predetermined period of time elapses since start of the count of the timer 222. In this case, while the seat unit 2 waits for reception of the transmission command (step S19), the timer 222 ends the count and the power supply is cut off, and thus the on-off information is not transmitted.

According to the embodiment described above, the information on the electronic devices (the seating switch SW1 and the buckle switch SW2) is not transmitted from the seat unit 2 during a period in which the vehicle unit 3 determines that communication with the seat unit 2 is unnecessary. Therefore, the life of the battery 21 can be extended.

According to the embodiment described above, the seating switch SW1 is connected in parallel with the power switch SW3, and the control section 22 turns on the power switch SW3 in response to the seating switch SW1 being turned on, and turns off the power switch SW3 after a predetermined period of time elapses since the seating switch SW1 is turned off. Accordingly, when the occupant sits on the slide seat 4, the seating switch SW1 is turned on to supply power from the battery 21 to the control section 22, thereby enabling communication with the vehicle unit 3. When the occupant leaves the slide seat 4, the seating switch SW1 is turned off, but the power switch SW3 is maintained on and the power supply to the control section 22 is maintained, until a predetermined period of time elapses. Therefore, the seat unit can transmit a fact that the seating switch SW1 is turned off to the vehicle unit 3 during the elapse of the predetermined period of time. Since the control section 22 turns off the power switch SW3 after the predetermined period of time elapses since the seating switch SW is turned off, power is saved by cutting off the power supply to the control section 22 during a period in which the occupant is not sitting on the slide seat 4.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the embodiment described above, when the IG switch is on and the speed of the vehicle is 3 km/hr or over, the vehicle unit 3 transmits a transmission command to the seat unit 2, and the invention is not limited thereto. The vehicle unit 3 may transmit a transmission command to the seat unit 2 during a period in which the IG switch is on. Further, the vehicle unit 3 may transmit a transmission command to the seat unit 2 when the speed of the vehicle is 3 km/h or over.

Further, according to the embodiment described above, the power supply from the battery 21 to the control section 22 is coupled with on and off of the seating switch SW1 in the seat unit 2, and the invention is not limited thereto. If the life of the battery 21 can be sufficiently extended by only transmitting the transmission command during a period in which the vehicle unit 3 determines that communication with the seat unit 2 is necessary, it is unnecessary to couple the power supply from the battery 21 to the control section 22 with on and off of the seating switch SW1.

Further, according to the embodiment described above, the seat unit 2 is mounted on the slide seat 4, and the invention is not limited thereto. The seat unit 2 may be mounted on a seat, and may be mounted on a seat having a rotation mechanism.

Further, according to the embodiment described above, the timer 222 is provided separately from the wireless communication IC 221A, and the invention is not limited thereto. A timer incorporated in the wireless communication IC 221A may be used as the timer 222.

Figure 6:
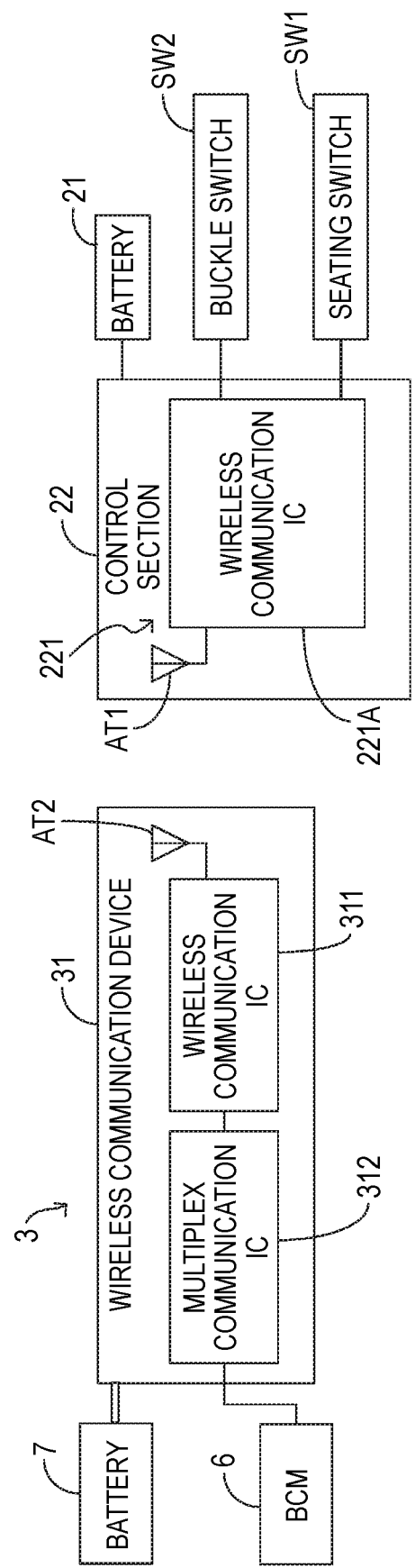
FIG. 6 is a schematic configuration diagram of a communication system of a reference example.

Next, a reference example of the communication system 1 will be described with reference to FIG. 6. In FIG. 6, the same components as those in FIG. 2 described above in the first embodiment are denoted by the same reference numerals, and a detailed description thereof will be omitted. In the reference example, the seating switch SW1 and the power switch SW3 are not provided between the control section 22 and the battery 21, and power is constantly supplied to the control section 22. In the present reference example, the wireless communication IC 221A can switch between two states: a wakeup state in which power consumption is large and a processing speed is high, and a sleep state in which the power consumption is less and the processing speed is lower. The wireless communication IC 221A switches to the wakeup state in response to reception of a wakeup signal from the vehicle unit 3, and switches to the sleep state in response to reception of a sleep signal. The wireless communication IC 221A can detect an on-off state of the seating switch SW1 and the buckle switch SW2.

Next, operations of the communication system 1 will be briefly described. When an IG switch is on and a vehicle speed is 3 km/h or over, the vehicle unit 3 transmits a wakeup signal to the seat unit 2. When the IG switch is on and the vehicle speed is less than 3 km/h, the vehicle unit 3 transmits a sleep signal to the seat unit 2.

The vehicle unit 3 retransmits the wakeup signal and the sleep signal until a reception signal is received from the seat unit 2, determines that the seat unit 2 is abnormal if the reception signal cannot be received even when the number of times of retransmission exceeds 100, and transmits a determination result to the BCM 6.

On the other hand, the seat unit 2 shifts to the sleep state when receiving the sleep signal, and shifts to the wakeup state when receiving the wakeup signal, and performs transmission of a switch state. With respect to the transmission of a switch state, a state of the seating switch SW1 and the buckle switch SW2 is regularly read, and is transmitted if there is a change in the switch state. The seat unit 2 transmits the switch state every regular transmission timer=1 s if the seating switch SW1 is on even when there is no change in the switch state, and transmits the switch state every regular transmission timer=10 s if the seating switch SW1 is off. Further, the seat unit 2 repeats the transmission of the switch state until a reception signal is received from the vehicle unit 3 in response to the transmission of the switch state. In a case where the reception signal cannot be received even when the number of times of transmission of the switch state exceeds 100, the seat unit 2 determines that the vehicle unit 3 is abnormal and shifts to the sleep state.

Figure 7A:
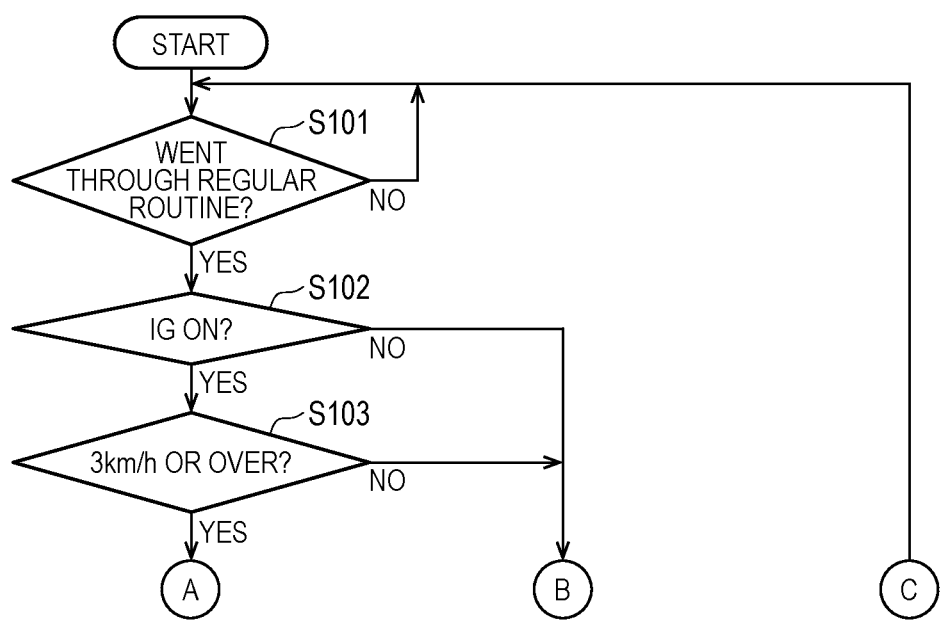
FIGS. 7A and 7B are flowcharts illustrating a processing procedure of a vehicle unit illustrated in FIG. 6.
Figure 7B:
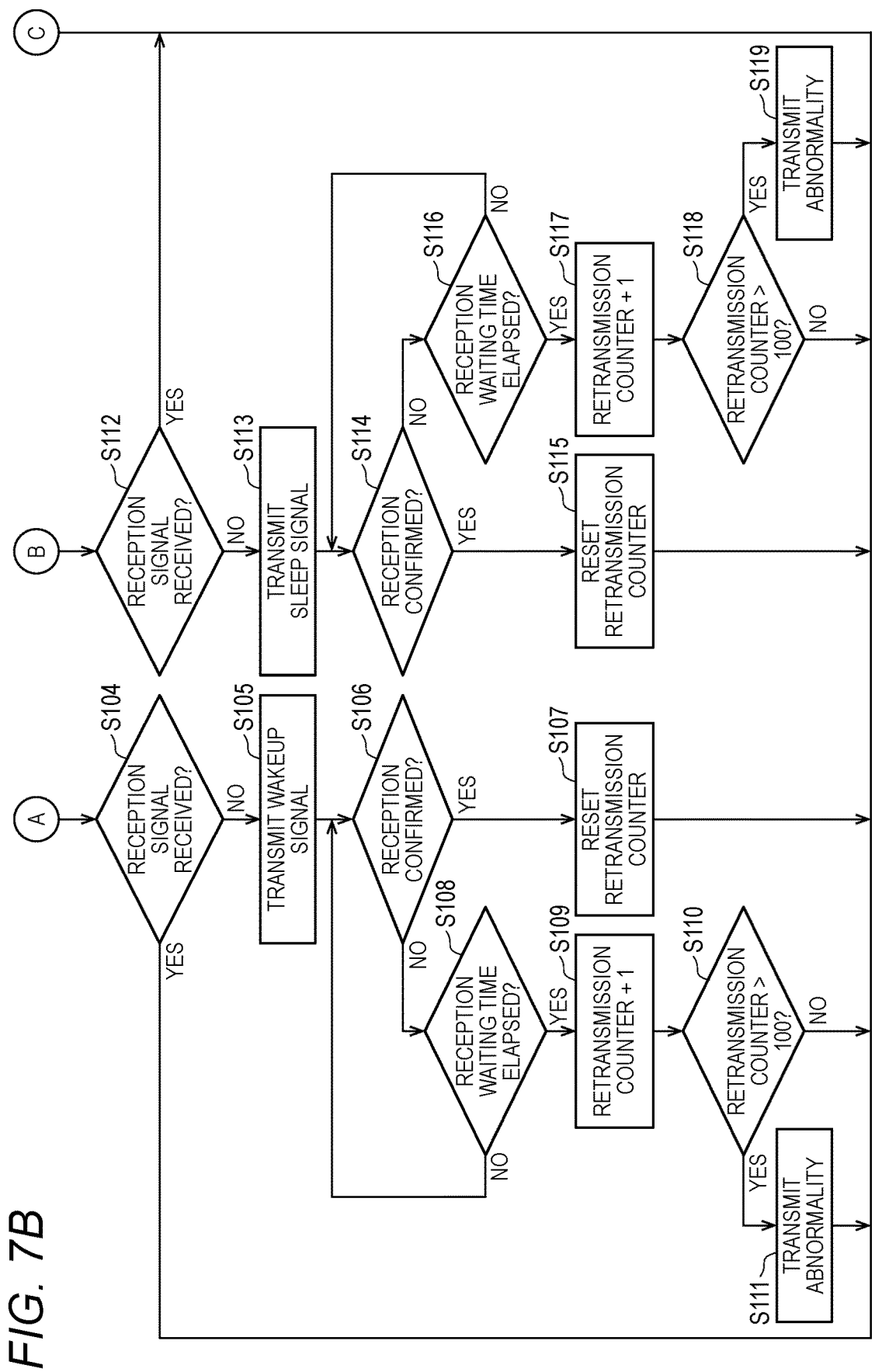

Next, detailed operations of the communication system 1 schematically described above will be described with reference to FIGS. 7A to 8B. First, as illustrated in FIGS. 7A and 7B, the wireless communication IC 311 of the vehicle unit 3 determines whether a regular routine (10 ms) has elapsed (step S101). The vehicle unit 3 waits for the regular routine to go through (Y in step S101), and determines whether the IG switch is on and a speed of the vehicle is 3 km/h or over (steps S102 and S103).

If the IG switch is on and the speed of the vehicle is 3 km/h or over (Y in step S102 and Y in step S103), the vehicle unit 3 proceeds to step S104. In step S104, the vehicle unit 3 determines whether a wakeup signal has been transmitted, and whether a reception signal from the seat unit 2 is received thereafter. When the wakeup signal has not been transmitted yet (N in step S104), the vehicle unit 3 transmits the wakeup signal (step S105). Further, when the wakeup signal has been transmitted but the reception signal from the seat unit 2 cannot be received (N in step S104), the vehicle unit 3 retransmits the wakeup signal (step S105).

Thereafter, the vehicle unit 3 performs reception confirmation until reception waiting time elapses (steps S106 and S108). If the reception signal can be received (Yin step S106), the vehicle unit 3 resets a retransmission counter of the wakeup signal (step S107), and thereafter returns to step S101. The vehicle unit 3 having returned to step S101 determines in step S104 that, after transmitting the wakeup signal, the reception signal from the seat unit 2 can be received (Y in step S104), and immediately returns to step S101 without transmitting a signal.

On the other hand, if the reception signal cannot be received even when the reception waiting time elapses (Y in step S108), the vehicle unit 3 adds 1 to the retransmission count (step S109). Accordingly, the number of times of retransmission of the wakeup signal is counted by the retransmission counter.

Thereafter, the vehicle unit 3 determines whether the retransmission counter exceeds 100 (step S1210). If the retransmission counter does not exceed 100 (N in step S110), the vehicle unit 3 immediately returns to step S101. On the other hand, if the retransmission counter exceeds 100 (Y in step S110), the vehicle unit 3 transmits an abnormality (failure) of the seat unit 2 to the BCM 6 (step S111), and thereafter returns to step S101.

In contrast, if the IG switch is not on and the speed of the vehicle is less than 3 km/h (N in step S102 and N in step S103), the vehicle unit 3 proceeds to step S12. In step S112, the vehicle unit 3 determines whether a sleep signal has been transmitted, and whether a reception signal from the seat unit 2 is received thereafter. When the sleep signal has not been transmitted yet (N in step S112), the vehicle unit 3 transmits the sleep signal (step S113). Further, when the sleep signal has been transmitted but the reception signal from the seat unit 2 cannot be received (N in step S112), the vehicle unit 3 retransmits the sleep signal (step S113).

Thereafter, the vehicle unit 3 performs reception confirmation until reception waiting time elapses (steps S114 and S116). If the reception signal can be received (Yin step S114), the vehicle unit 3 resets a retransmission counter of the sleep signal (step S115), and thereafter returns to step S101. The vehicle unit 3 having returned to step S101 determines in step S112 that, after transmitting the sleep signal, the reception signal from the seat unit 2 can be received (Y in step S112), and immediately returns to step S101 without transmitting a signal.

On the other hand, if the reception signal cannot be received even when the reception waiting time elapses (Y in step S116), the vehicle unit 3 adds 1 to the retransmission count (step S117). Accordingly, the number of times of retransmission of the sleep signal is counted by the retransmission counter.

Thereafter, the vehicle unit 3 determines whether the retransmission counter exceeds 100 (step S118). If the retransmission counter does not exceed 100 (N in step S118), the vehicle unit 3 immediately returns to step S101. On the other hand, if the retransmission counter exceeds 100 (Y in step S118), the vehicle unit 3 transmits an abnormality (failure) of the seat unit 2 to the BCM 6 (step S119), and thereafter returns to step S101.

In addition to the processing illustrated in FIGS. 7A and 7B, the vehicle unit 3 performs reception processing of receiving information on the switch state from the seat unit 2, and when receiving the information on the switch state, transmits the information to the BCM 6 and transmits a reception signal to the seat unit 2.

Figure 8A:
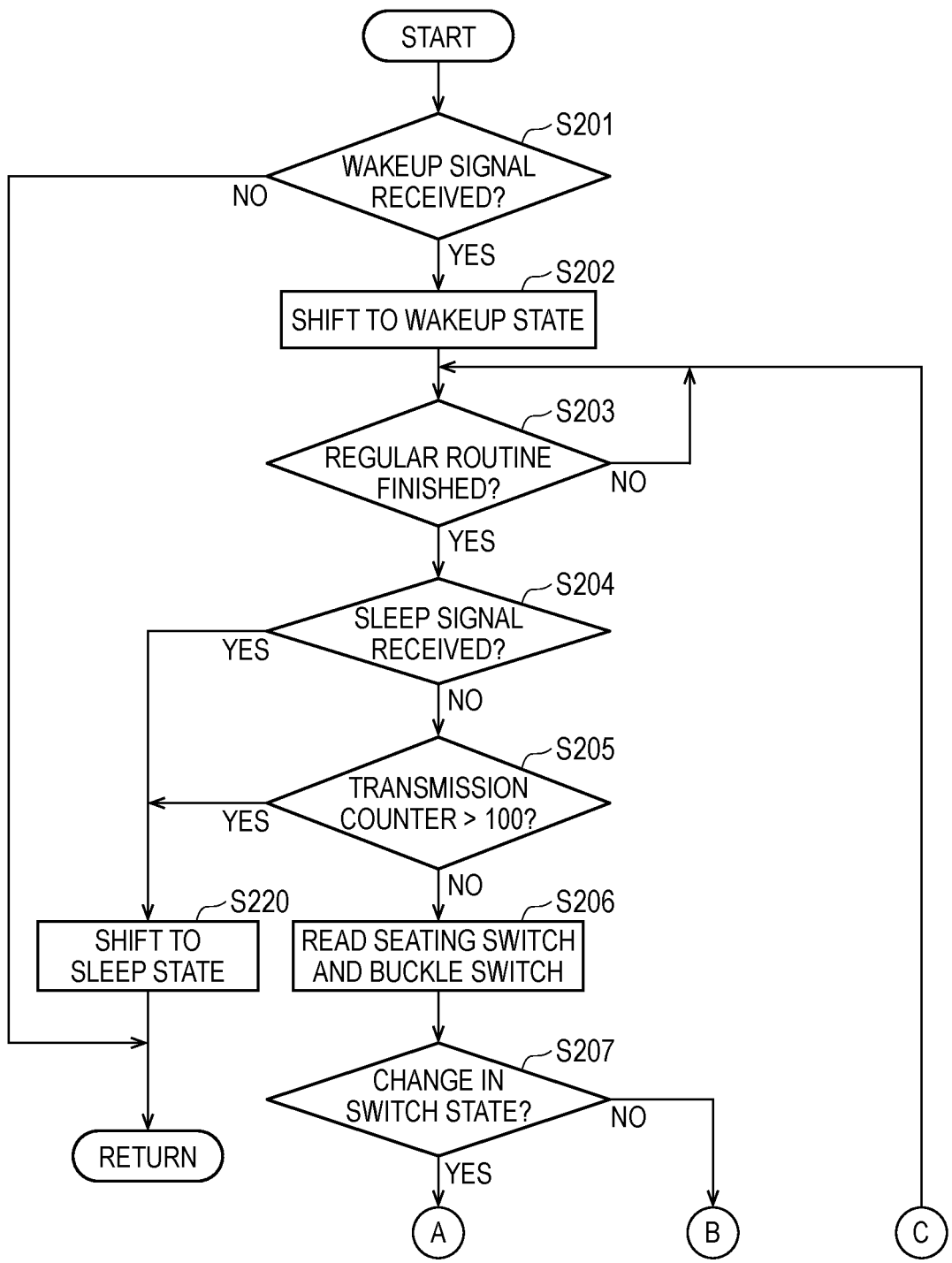
FIGS. 8A and 8B are flowcharts illustrating a processing procedure of a seat unit illustrated in FIG. 6.
Figure 8B:
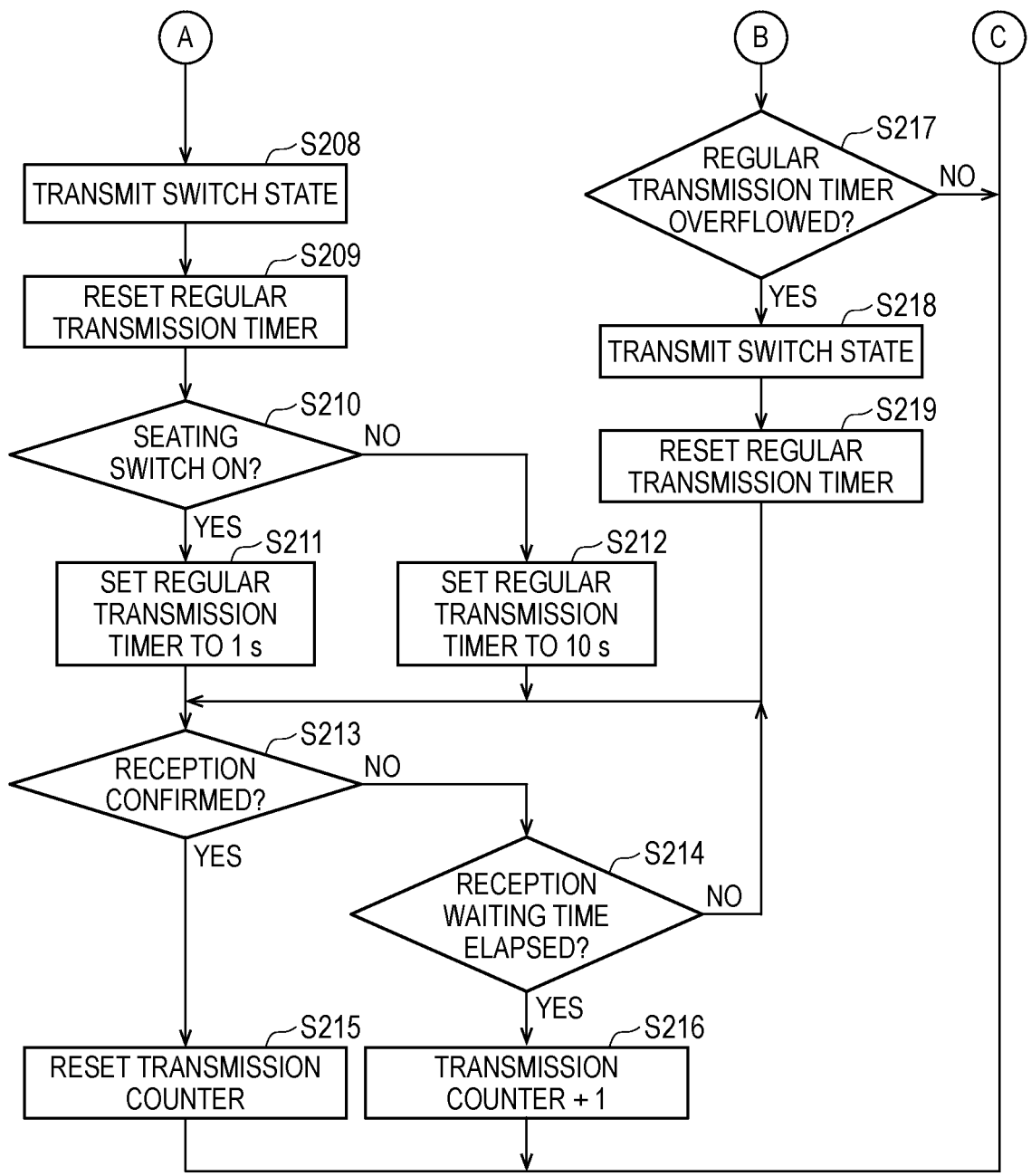

As illustrated in FIGS. 8A and 8B, upon receiving a wakeup signal (Y in step S201), the seat unit 2 transmits a reception signal to the vehicle unit 3 and thereafter shifts to the wakeup state (step S202). Thereafter, the seat unit 2 waits the regular routine (100 ms) to go through (Y in step S203), and determines whether a sleep signal is received from the vehicle unit 3 (step S204).

If the sleep signal is not received (N in step S204), the seat unit 2 determines whether a transmission counter to be described below exceeds 100 (step S205). If the transmission counter does not exceed 100 (N in step S205), the seat unit 2 reads the state of the seating switch SW1 and the buckle switch SW2 (step S206). As a result of the reading, if there is a change in the switch state (Y in step S207), the seat unit 2 transmits the switch state (step S208), and resets a regular transmission timer (step S209).

The seat unit 2 sets the regular transmission timer to 1 s (step S211) if the seating switch SW1 is on (Y in step S210), and sets the regular transmission timer to 10 s (step S212) if the seating switch SW1 is off (N in step S210), and thereafter proceeds to the next step. Next, the seat unit 2 performs confirmation of the reception of the reception signal from the vehicle unit 3 with respect to the transmission of the switch state until the reception waiting time elapses (steps S213 and S214). Upon receiving the reception signal (Y in step S213), the seat unit 2 resets the transmission counter (step S215), and returns to step S201.

On the other hand, if the reception signal cannot be received even when the reception waiting time elapses (Y in step S214), the seat unit 2 adds 1 to the transmission counter (step S216), and returns to step S201. Accordingly, the number of times of transmission of the switch state is counted by the transmission counter.

If there is no change in the switch state (N in step S207), the seat unit determines whether the regular transmission timer has overflowed (step S217). If there is no overflow (N in step S217), the seat unit 2 immediately returns to step S201. On the other hand, if there is an overflow (Y in step S217), the seat unit 2 transmits the switch state (step S218), resets the regular transmission timer (step S219), and proceeds to step S213.

When the seat unit 2 receives the sleep signal (Y in step S204) and the transmission counter exceeds 100 (Y in step S205), the seat unit 2 transmits a reception signal to the vehicle unit 3, and thereafter shifts to the sleep state (step S220) and returns to step S201.

According to an aspect of the exemplary embodiments described above, a communication system (1) includes a seat unit (2) configured to be mounted on a seat (4) of a vehicle and to receive power supply from a battery (21) to operate, and a vehicle unit (3) configured to wirelessly communicate with the seat unit (2). The vehicle unit (3) includes a determination section (311) configured to determine whether communication with the seat unit (2) is necessary, and a command transmission section (311) configured to transmit to the seat unit (2) a transmission command requesting the seat unit (2) to transmit information on an electronic device (SW1, SW2) mounted on the seat (4) during a period in which the determination section (311) determines that the communication with the seat unit (2) is necessary. The seat unit (2) is configured to transmit the information on the electronic device (SW1, SW2) upon receipt of the transmission command.

The seat unit (2) may include a seating switch (SW1) configured to be turned on when seating on the seat (4) is detected and to be turned off when leaving the seat (4) is detected, a control section (22) configured to control wireless communication with the vehicle unit (3), and a power switch (SW3) configured to turn on and off power supply from the battery (21) to the control section (22). The seating switch (SW1) is connected in parallel with the power switch (SW3). The control section (22) is configured to turn on the power switch (SW3) in response to turning on of the seating switch (SW1), and to turn off the power switch (SW3) after a predetermined period of time elapses from turning off of the seating switch (SW1).

The determination section (311) may be configured to determine whether the communication with the seat unit (2) is necessary based on at least one of an on-off state of an ignition switch of the vehicle and a speed of the vehicle.

According to another aspect of the exemplary embodiments described above, a vehicle unit (3) is configured to wirelessly communicate with a seat unit (2) mounted on a seat (4) of a vehicle, the seat unit being configured to receive power supply from a battery (21) to operate. The vehicle unit (3) includes a determination section (311) configured to determine whether communication with the seat unit (2) is necessary, and a command transmission section (311) configured to transmit to the seat unit (2) a transmission command requesting the seat unit (2) to transmit information on an electronic device (SW1, SW2) mounted on the seat (4) during a period in which the determination section (311) determines that the communication with the seat unit (2) is necessary.

According to another aspect of the exemplary embodiments described above, a seat unit (2) is configured to be mounted on a seat (4) of a vehicle and to receive power supply from a battery (21) to operate, the seat unit (2) being configured to wirelessly communicate with the vehicle unit (3) described above. The seat unit (2) includes an information transmission section (221A) configured to transmit information on an electronic device (SW1, SW2) upon receipt of the transmission command from the vehicle unit (3).

What is claimed is:

1. A communication system comprising a seat unit configured to be mounted on a seat of a vehicle and to receive power supply from a battery to operate, and a vehicle unit configured to wirelessly communicate with the seat unit,
   wherein the vehicle unit comprises a determination section configured to determine whether communication with the seat unit is necessary, and a command transmission section configured to transmit to the seat unit a transmission command requesting the seat unit to transmit information on an electronic device mounted on the seat during a period in which the determination section determines that the communication with the seat unit is necessary, and
   wherein the seat unit is configured to transmit the information on the electronic device upon receipt of the transmission command.

2. The communication system according to claim 1, wherein the seat unit comprises a seating switch configured to be turned on when seating on the seat is detected and to be turned off when leaving the seat is detected, a control section configured to control wireless communication with the vehicle unit, and a power switch configured to turn on and off power supply from the battery to the control section,
   wherein the seating switch is connected in parallel with the power switch, and
   wherein the control section is configured to turn on the power switch in response to turning on of the seating switch, and to turn off the power switch after a predetermined period of time elapses from turning off of the seating switch.

3. The communication system according to claim 1, wherein the determination section is configured to determine whether the communication with the seat unit is necessary based on at least one of an on-off state of an ignition switch of the vehicle and a speed of the vehicle.

4. The communication system according to claim 2, wherein the determination section is configured to determine whether the communication with the seat unit is necessary based on at least one of an on-off state of an ignition switch of the vehicle and a speed of the vehicle.

5. A vehicle unit configured to wirelessly communicate with a seat unit mounted on a seat of a vehicle, the seat unit being configured to receive power supply from a battery to operate, the vehicle unit comprising:
   a determination section configured to determine whether communication with the seat unit is necessary; and
   a command transmission section configured to transmit to the seat unit a transmission command requesting the seat unit to transmit information on an electronic device mounted on the seat during a period in which the determination section determines that the communication with the seat unit is necessary.

6. A seat unit configured to be mounted on a seat of a vehicle and to receive power supply from a battery to operate, the seat unit being configured to wirelessly communicate with the vehicle unit according to claim 5,
wherein the seat unit comprises an information transmission section configured to transmit information on an electronic device upon receipt of the transmission command from the vehicle unit.

\* \* \* \* \*